F. K. WARD.
Milk-Cooler.
No. 210,277.  Patented Nov. 26, 1878.
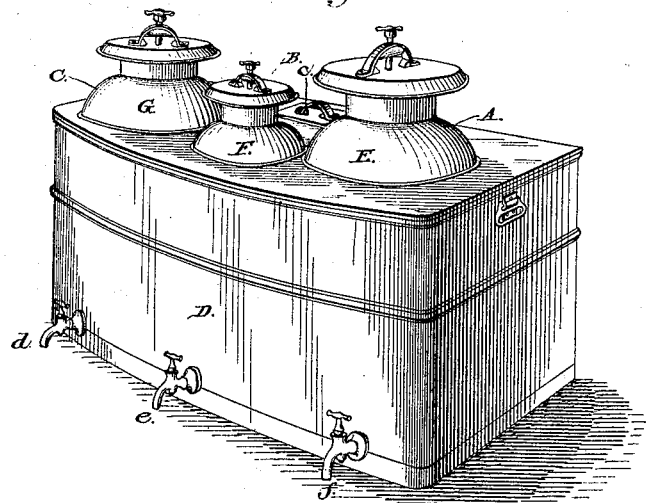
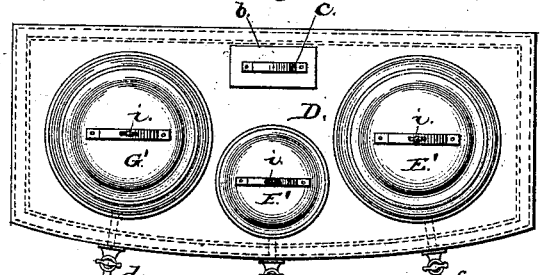
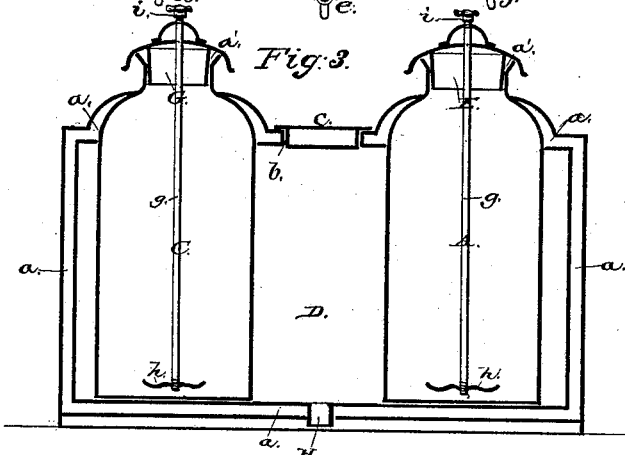
WITNESSES  INVENTOR

UNITED STATES PATENT OFFICE.

FRANK K. WARD, OF WASHINGTON, DISTRICT OF COLUMBIA.

IMPROVEMENT IN MILK-COOLERS.

Specification forming part of Letters Patent No. 210,277, dated November 26, 1878; application filed November 6, 1878.

*To all whom it may concern:*

Be it known that I, FRANK K. WARD, of Washington city, in the District of Columbia, have invented certain new and useful Improvements in Milk-Cans; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a view, in perspective, of a milk and cream can embodying the improvements in my invention. Fig. 2 is a plan view, and Fig. 3 a vertical sectional view, of the same.

This invention has relation to devices for containing milk, buttermilk, and cream, and is especially adapted to be transported in milk or dairy wagons, from which each of these articles are sold in quantities to suit the purchaser; and it consists in a double-walled case containing one or more milk or cream receptacles, inseparably attached therein, said receptacles having a single thickness within the double-walled case, and their shoulders extending above, protected by raised portions of the double-walled case, all of which will be hereinafter more fully described, and particularly pointed out in the claim.

In the accompanying drawings similar letters of reference indicate corresponding parts in the several figures.

This milk-can is especially adapted to delivery-wagons, although it may be used in dairies.

Three cans, A B C, are incased in a vessel or shell, D, having double walls throughout, whereby non-conducting air-spaces $a$ are provided, which surround the several cans. An air-space is formed also between the raised portions E F G of the case D and the shoulders of the cans A B C.

The vessel D is provided with an opening, $b$, in its top, having a removable air-tight cap, $c$. The vessel D is provided with cocks $d\ e\ f$, communicating, by means of tubes, with the cans A B C. The can A is intended to be filled with sweet milk, the can B with cream, and the can C with buttermilk, so that the customer may be supplied with either kind.

The vessel D in which the cans are incased is filled in summer with ice-water or broken ice and salt, or other refrigerating material, to keep the contents of the cans cool during the course of delivery or while in the dairy.

The cans within the shell D, having only one thickness of metal, are especially adapted to cool the milk, cream, or buttermilk, causing it to be more refreshing to the consumer, and tending to preserve it from atmospheric changes.

In winter the non-conducting air-spaces preserve the natural heat of the milk, and prevent it from freezing while being delivered to consumers or during transportation.

The covers E' F' G' are perforated to receive the rods $g$, which extend through the top of the covers and terminate in a handle, $i$, the rods $g$ being of sufficient length to extend nearly to the bottom of the can, and are provided with screw-threads, which enter the agitator $h$. The agitators $h$ are preferably made of extra heavy tin, having concentric corrugations, as shown.

The milk when put in the cans would soon settle, the cream arising to the top, so that when drawing from the cocks for consumers, only the settled or skim milk would be furnished; but if the handle $i$ is raised the agitator $h$ creates a current in the can, and the milk and cream are thoroughly agitated, and in this state drawn from the cocks and delivered to the consumer, thus insuring a proper amount of cream with each amount of milk delivered.

It will also be seen that the current formed by raising the agitator also serves to cause the contents to present new portions to the cooling action of the refrigerating material in the case D.

The double walls of the shell D and the walls of the raised portions E F G, having the non-conducting air-spaces $a\ a'$, retain the cold air within the shell D, and form a non-conductor, so that the milk, cream, or buttermilk is always kept at an appropriate temperature, which is a desideratum when milk is sold from delivery-wagons, as well as when kept on sale at the dairy.

The vessel D may be filled with ice and water, which will, of course, keep the contents of the cans A B C cool, and this ice-water may be drawn from the outlet H for drinking purposes.

The advantages and utility of this invention are obvious.

Having thus described my invention, what I claim as new and useful, and desire to secure by Letters Patent of the United States, is—

A milk-cooling apparatus for supplying milk direct to the consumer, consisting of the double-walled case D, containing single-walled cans, and having single-walled raised portions E F G, between which and the shoulders of the cans an air-space is formed, substantially as and for the purpose set forth.

In testimony that I claim the foregoing as my own I affix my signature in presence of two witnesses.

FRANK K. WARD.

Witnesses:
JOHN O'DONNOGHUE,
H. J. ENNIS.